(12) United States Patent
Iida et al.

(10) Patent No.: US 7,561,409 B2
(45) Date of Patent: Jul. 14, 2009

(54) SOLID ELECTROLYTIC CAPACITOR ELEMENT, MANUFACTURING METHOD OF SOLID ELECTROLYTIC CAPACITOR ELEMENT AND SOLID ELECTROLYTIC CAPACITOR

(75) Inventors: Takahisa Iida, Hirakata (JP); Mutsumi Yano, Hirakata (JP); Takashi Umemoto, Hirakata (JP); Hiroshi Nonoue, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 200 days.

(21) Appl. No.: 11/510,786

(22) Filed: Aug. 28, 2006

(65) Prior Publication Data
US 2007/0045696 A1 Mar. 1, 2007

(30) Foreign Application Priority Data
Aug. 29, 2005 (JP) .............................. 2005-248451
Jun. 15, 2006 (JP) .............................. 2006-166688

(51) Int. Cl.
*H01G 9/02* (2006.01)
*H01G 5/013* (2006.01)

(52) U.S. Cl. ....................................... 361/525; 361/524

(58) Field of Classification Search ................. 361/524, 361/525
See application file for complete search history.

(56) References Cited

U.S. PATENT DOCUMENTS

| 4,780,796 A | 10/1988 | Fukuda et al. |
| 6,215,652 B1 | 4/2001 | Yoshida et al. |
| 7,265,965 B2 * | 9/2007 | Naito et al. .................. 361/532 |
| 2005/0025699 A1 * | 2/2005 | Reed et al. ............. 423/594.17 |

FOREIGN PATENT DOCUMENTS

| JP | 63-173313 | 7/1988 |
| JP | 11-329902 | 11/1999 |
| WO | WO 2005048277 A1 * | 5/2005 |

* cited by examiner

*Primary Examiner*—Eric Thomas
*Assistant Examiner*—David M Sinclair
(74) *Attorney, Agent, or Firm*—NDQ & M Watchstone LLP

(57) ABSTRACT

A solid electrolytic capacitor element includes a first oxide layer formed on an anode. The solid electrolytic capacitor further includes a second oxide layer formed on the first oxide layer, and a cathode formed on the second oxide layer. The first oxide layer includes $Nb_2O_5$ and the second oxide layer includes $NbO_x$ ($1 \leq x \leq 2$).

3 Claims, 8 Drawing Sheets

102　103　　104a 104b　101b 101a
　　　　　　　　104　　　　101

106　102　103　104a 104b　101b 101a　107
　　　　　　　　　104　　　　101

SOLID ELECTROLYTIC CAPACITOR ELEMENT, MANUFACTURING METHOD OF SOLID ELECTROLYTIC CAPACITOR ELEMENT AND SOLID ELECTROLYTIC CAPACITOR

CROSS REFERENCE TO RELATED APPLICATIONS

This application is based upon and claims the benefit of priority from prior Japanese Patent Application No.2005-248451, filed on Aug. 29, 2005, and prior Japanese Patent Application No. 2006-166688, filed on Jun. 15, 2006; the entire contents of which are incorporated herein by reference.

BACKGROUND OF THE INVENTION

1. Field of the Invention

The present invention relates to a solid electrolytic capacitor element, a manufacturing method of the solid electrolytic capacitor element, and a solid electrolytic capacitor. In particular, the present invention relates to an element using niobium oxide as a dielectric, manufacturing method of the element, and the solid electrolytic capacitor.

2. Description of the Related Art

Conventionally, it has been known as a solid electrolytic capacitor using niobium oxide ($Nb_2O_5$, or niobium pentoxide) formed by anodizing metal niobium, as a dielectric layer (for example, refer to Japanese Unexamined Application No. 52-39164).

FIG. 1 is a cross-sectional view for explaining a structure of a conventional solid electrolytic capacitor. With reference to FIG. 1, the structure of the conventional solid electrolytic capacitor will be explained.

In the conventional solid electrolytic capacitor, as shown in FIG. 1, an anode 101 is provided with an anode lead 101a, and a cuboid base substance 101b formed of a porous sintered body of niobium particles. The anode lead 101a has a part buried in the base substance 101b.

On the anode 101, an oxide layer 102 formed of $Nb_2O_5$ is formed so as to cover the base substance 101b. Here, the oxide layer 102 functions as what is called a dielectric layer.

On the oxide layer 102, a conductive polymer layer 103 formed of polypyrrole and the like is formed so as to cover the oxide layer 102. Here, the conductive polymer layer 103 functions as what is called an electrolyte layer.

On the conductive polymer layer 103, a cathode 104 having a laminated structure is formed. The laminated structure includes a first conductive layer 104a including carbon particles and formed so as to cover the conductive polymer layer 103; and a second conductive layer 104 including silver particles and formed so as to cover the first conductive layer 104a.

A conductive adhesive layer 105 is formed on the cathode 104. Moreover, a cathode terminal 106 is formed on the conductive adhesive layer 105. Additionally, an anode terminal 107 is connected onto the anode lead 101a exposed through the base substance 101b and the oxide layer 102.

Furthermore, a mold external packaging resin 108 is formed on the cathode 104, the cathode terminal 106 and the anode terminal 107. End portions of the cathode terminal 106 and the anode terminal 107 are pulled out to the outside. Thereby, the conventional solid electrolytic capacitor is configured.

FIGS. 2 to 6 are cross-sectional views for explaining processes for forming the conventional solid electrolytic capacitor. Next, with reference to FIGS. 2 to 6, descriptions will be provided for processes for forming the conventional solid electrolytic capacitor having a structure as mentioned above.

First, as shown in FIG. 2, the anode 101 provided with the anode lead 101a and the cuboid base substance 101b is formed. The base substance 101b is formed of a porous sintered body of niobium particles and is formed by sintering a compact in a vacuum. The compact is formed of niobium particles, and a part of the anode lead 101a is buried in the compact.

Next, as shown in FIG. 3, by anodizing the anode 101 in a solution of phosphoric acid and the like, the oxide layer 102 of $Nb_2O_5$ is formed on the base substance 101b so as to cover the basic substance 101b.

Subsequently, as shown in FIG. 4, the conductive polymer layer 103 of polypyrrole and the like is formed, for example, by polymerizing pyrrole so as to cover the oxide layer 102.

Next, as shown in FIG. 5, the first conductive layer 104a including carbon particles is formed by applying and drying carbon paste on the conductive polymer layer 103 so as to cover the conductive polymer layer 103. Thereafter, the second conductive layer 104b including silver particles is formed by applying and drying silver paste on the first conductive layer 104a so as to cover the first conductive layer 104a. Thereby, the cathode 104, which has a laminated structure, is formed. The laminated structure includes the first conductive layer 104a and the second conductive layer 104b in a manner covering the conductive polymer layer 103.

Thereafter, as shown in FIG. 6, a conductive adhesive layer 105, which connects the cathode 104 and the cathode terminal 106 with each other, is formed. The conductive adhesive layer 105 is formed by adhering the cathode terminal 106 onto the cathode 104 with a conductive adhesive applied on the cathode terminal 106, and by drying this conductive adhesive. Additionally, the anode terminal 107 is welded onto the anode lead 101a exposed through the base substance 101b and the oxide layer 102.

Finally, as shown in FIG. 1, the mold external packaging resin 108 is formed on the cathode 104, the cathode terminal 106 and the anode terminal 107. The end portions of the cathode terminal 106 and the anode terminal 107 are pulled out to the outside. Thus, the conventional solid electrolytic capacitor is formed.

SUMMARY OF THE INVENTION

In a first aspect of the present invention, a solid electrolytic capacitor element includes a first oxide layer formed on an anode, a second oxide layer formed on the first oxide layer, and a cathode formed on the second oxide layer. The first oxide layer includes $Nb_2O_5$. and the second oxide layer includes $NbO_x$ ($1 \leq x \leq 2$).

In the solid electrolytic capacitor element according to the first aspect of the present invention, the second oxide layer includes $NbO_x$ ($1 \leq x \leq 2$) formed between the first oxide layer and the cathode. The first oxide layer includes $Nb_2O_5$ which functions as a dielectic layer. The second oxide layer has a large conductivity, thereby functioning as an electrolyte layer. Accordingly, it is not necessary to additionally form an electrolyte layer of another material. Moreover, since the second and first oxide layers respectively include the same constituent elements (Nb and O), the two oxide layers have large adhesion to each other. Hence, a contact resistance between the first oxide layer and the cathode can be reduced. As a result, the ESR can be reduced. Furthermore, because the second oxide layer includes the same constituent elements as those of the first oxide layer, and is used as an electrolyte layer, the manufacturing procedure can be simplified.

Consequently, with the solid electrolytic capacitor element according to the first aspect of present invention, it is possible to obtain the solid electrolytic capacitor element having a small ESR, and to simplify the manufacturing procedure.

Incidentally, when a composition ratio x of niobium oxide $NbO_x$ in the second oxide layer is larger than 2, since conductivity is reduced, the second oxide layer cannot function as an electrolyte layer. When the composition ratio x is smaller than 1, adhesion of the second oxide layer to the first oxide layer tends to be reduced. Accordingly, it is preferable that the composition ratio x of niobium oxide $NbO_x$ in the second oxide layer is in a range of $1 \leq x \leq 2$.

In the solid electrolytic capacitor element according to the first aspect, it is preferable that the cathode has a laminated structure of a first conductive layer and the second conductive layer. The first conductive layer formed on the second oxide layer includes carbon particles. The second conductive layer formed on the first conductive layer includes silver particles. By configuring the solid electrolytic capacitor element as described above, the first conductive layer including the carbon particles, and the second oxide layer including $NbO_x$ ($1 \leq x \leq 2$) have favorable adhesion to each other. Thus, it is possible to achieve favorable electrical connection therebetween. Thereby, the ESR can be further reduced.

In a second aspect of the present invention, a manufacturing method of a solid electrolytic capacitor element includes the steps described below. (1) Forming the first oxide layer including $Nb_2O_5$ by anodizing an anode including niobium in an electrolytic solution, (2) forming the second oxide layer including $NbO_x$ ($1 \leq x \leq 2$) on the first oxide layer, by thermal treatment of the first oxide layer under a reduced pressure, and (3) forming the cathode on the second oxide layer.

In the manufacturing method of a solid electrolytic capacitor element according to the second aspect, since the anode including niobium is anodized in an electrolytic solution, the first oxide layer including $Nb_2O_5$ can be easily formed on the anode. Furthermore, since the first oxide layer including $Nb_2O_5$ is thermally treated under a reduced pressure, it is possible to deoxidize $Nb_2O_5$ located on a surface side of the first oxide layer. Moreover, the second oxide layer including $NbO_x$ ($1 \leq x \leq 2$) and having a large conductivity, can be formed on the first oxide layer easily with favorable adhesion. Thereby, it is possible to easily form the first oxide layer including $Nb_2O_5$ which functions as a dielectric layer on the anode. Also it is possible to easily form the second oxide layer including $NbO_x$ ($1 \leq x \leq 2$) which functions as an electrolyte layer. Accordingly, it is possible to easily manufacture a solid electrolytic capacitor element having a small ESR, without additionally forming an electrolyte layer.

In the manufacturing method of a solid electrolytic capacitor element according to the second aspect, the step of forming a second oxide layer preferably includes a step of applying the thermal treatment at a temperature equal to or more than 140° C. and less than 250° C. By configuring the manufacturing method as described above, while the first oxide layer including $Nb_2O_5$ is caused to remain, a composition ratio x of niobium oxide $NbO_x$ in the second oxide layer can easily set in a range of $1 \leq x \leq 2$.

In a third aspect of the present invention, a solid electrolytic capacitor includes a first oxide layer formed on an anode, a second oxide layer formed on the first oxide layer, a cathode formed on the second oxide layer; and an external packaging body formed on the cathode. The first oxide layer includes $Nb_2O_5$ and the second oxide layer includes $NbO_x$ ($1 \leq x \leq 2$).

Specifically, in the solid electrolytic capacitor according to the third aspect, since the external packaging body is formed on the solid electrolytic capacitor element according to the first aspect, it is possible to obtain a highly reliable solid electrolytic capacitor, which is not easily influenced by a surrounding environment.

DETAILED DESCRIPTION OF THE PREFERRED EMBODIMENTS

Hereinbelow, examples of the present invention will be described on the bases of the drawings.

Example 1

Figure 1:
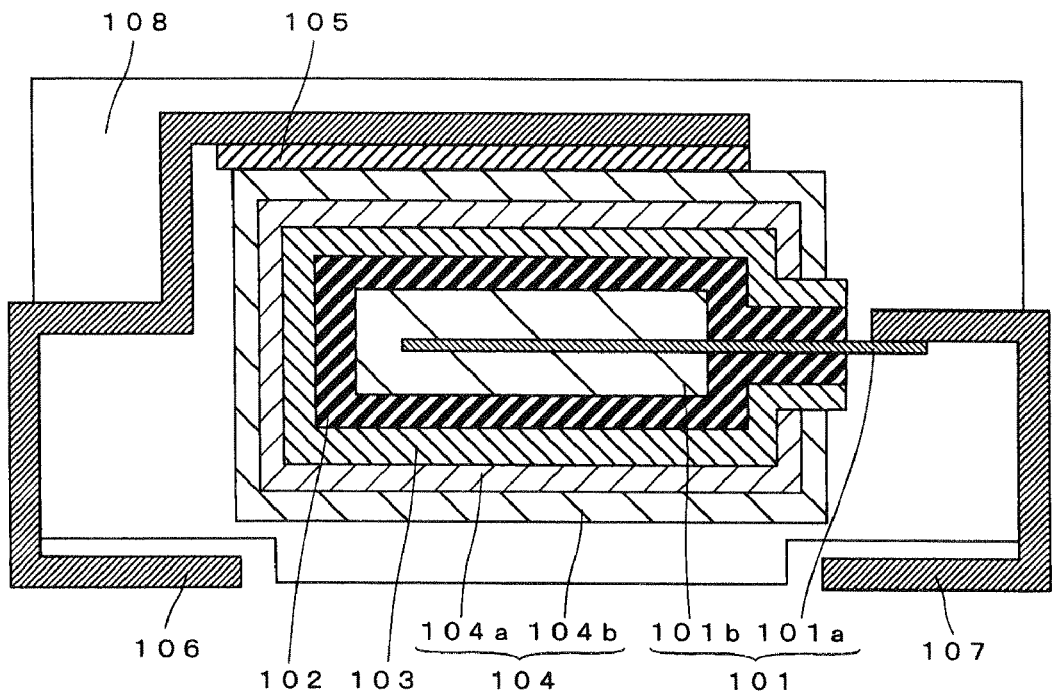
FIG. 1 is a cross-sectional view for explaining a structure of a conventional solid electrolytic capacitor.
Figure 2:
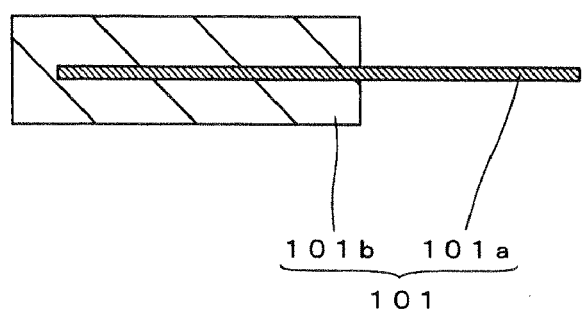
FIG. 2 is a cross-sectional view for explaining a first process of formation processes of the conventional solid electrolytic capacitor.
Figure 3:
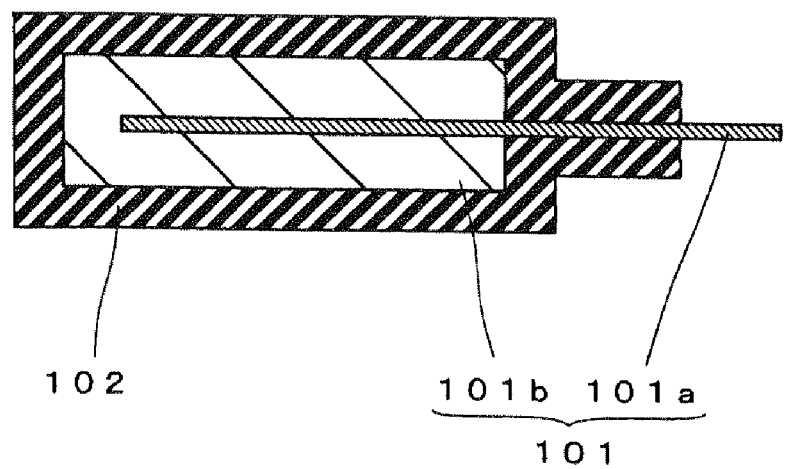
FIG. 3 is a cross-sectional view for explaining a second process of the formation processes of the conventional solid electrolytic capacitor.
Figure 4:
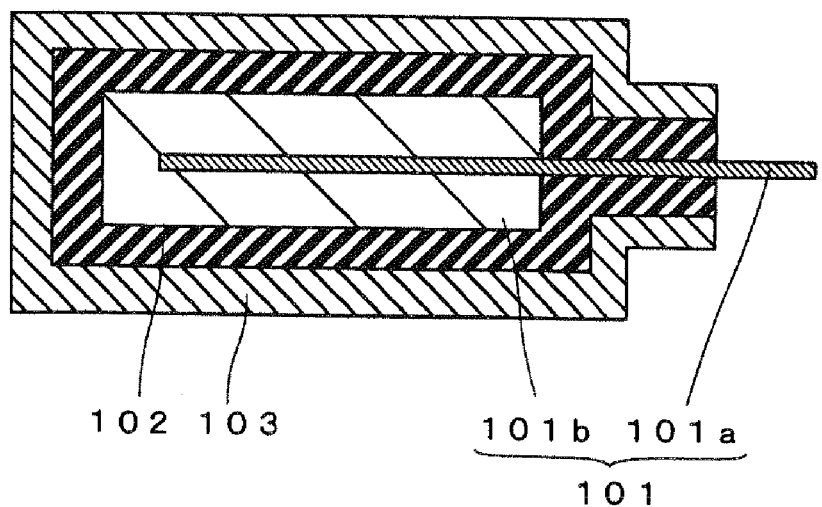
FIG. 4 is a cross-sectional view for explaining a third process of the formation processes of the conventional solid electrolytic capacitor.
Figure 5:
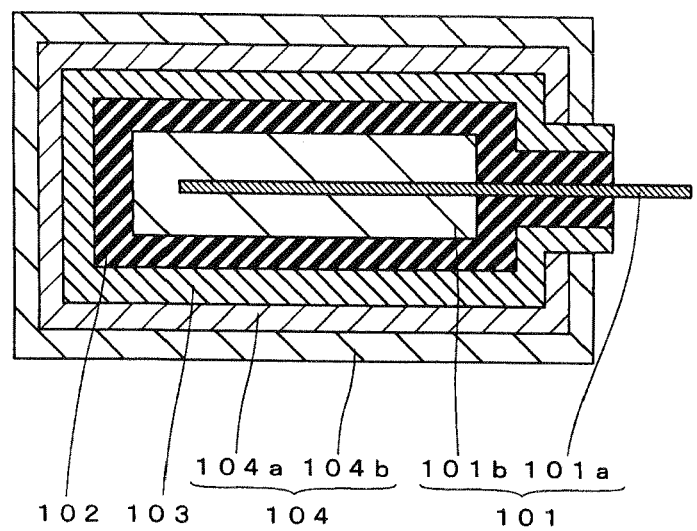
FIG. 5 is a cross-sectional view for explaining a fourth process of the formation processes of the conventional solid electrolytic capacitor.
Figure 6:
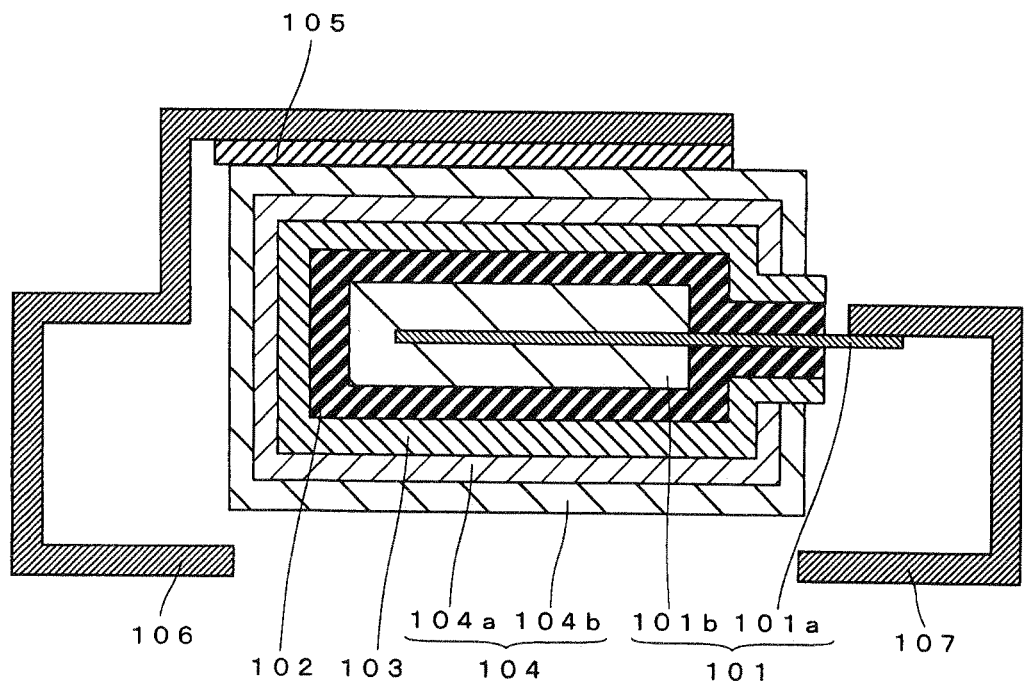
FIG. 6 is a cross-sectional view for explaining a fifth process of the formation processes of the conventional solid electrolytic capacitor.
Figure 7:
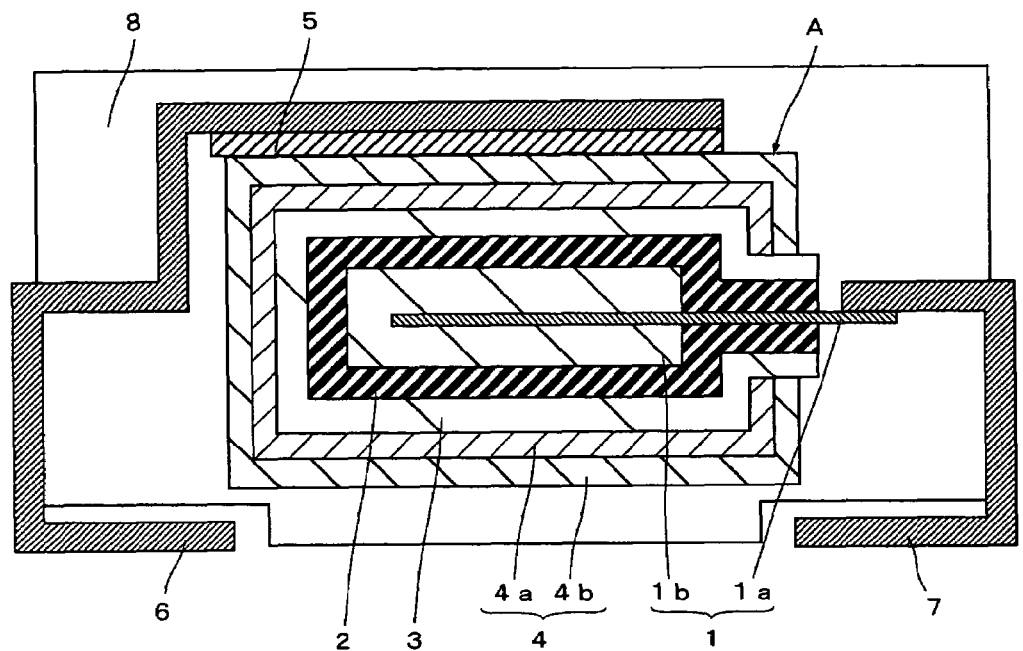
FIG. 7 is a cross-sectional view for explaining a structure of a solid electrolytic capacitor according to Example 1 of the present invention.

FIG. 7 is a cross-sectional view for explaining a structure of a solid electrolytic capacitor according to Example 1 of the present invention.

In the cuboid solid electrolytic capacitor according to Example 1 of the present invention, as shown in FIG. 7, an anode 1 is provided with an anode lead 1a made of niobium, and a cuboid base substance 1b made of a porous sintered body of niobium particles. The cuboid base substance 1b is of about 3.3 mm×about 2.7 mm×about 1.7 mm, the niobium particles respectively having an average particle diameter of about 1 μm. The anode lead 1a is partially buried into the base substance 1b.

On the anode 1, a first oxide layer 2 including $Nb_2O_5$ is formed so as to cover the cuboid base substance 1b. Here, the first oxide layer 2 functions as what is called a dielectric layer.

On the first oxide layer 2, a second oxide layer 3 having a film thickness of about 25 nm is formed. The second oxide layer 3 includes $NbO_{1.5}$ is formed so as to cover the first oxide layer 2. Here, the second oxide layer 3 functions as what is called an electrolyte layer.

On the second oxide layer 3, a cathode 4 having a laminated structure is formed. The laminated structure includes a first conductive layer 4a having a film thickness of about 10 μm and including carbon particles, and a second conductive layer 4b having a film thickness of about 10 μm and including silver particles. The first conductive layer 4a is formed so as to cover the second oxide layer 3, and the second conductive layer 4b is formed so as to cover the first conductive layer 4a. Thereby, a solid electrolytic capacitor element A is formed, in which the first oxide layer 2, the second oxide layer 3 and the cathode 4 are sequentially laminated on the anode 1.

A conductive adhesive layer 5 is formed on a top surface of the cathode 4. Moreover, a cathode terminal 6 is formed on the conductive adhesive layer 5. An anode terminal 7 is connected onto the anode lead 1a exposed through the base substance 1b. Furthermore, a mold external packaging resin 8 is formed in the solid electrolytic capacitor element A. The cathode terminal 6 and the anode terminal 7 is pulled out to the outside. Thereby, the solid electrolytic capacitor according to Example 1 of the present invention is configured. Here, the mold external packaging resin is an example of an "external packaging body" of the present invention.

FIGS. 8 to 12 are cross-sectional views for explaining formation processes of the solid electrolytic capacitor according to Example 1 of the present invention. With reference to FIGS. 8 to 12, descriptions are provided for the formation processes of the solid electrolytic capacitor, which has a structure as mentioned above, according to Example 1 of the present invention.

(Preparation of an Anode)

Figure 8:
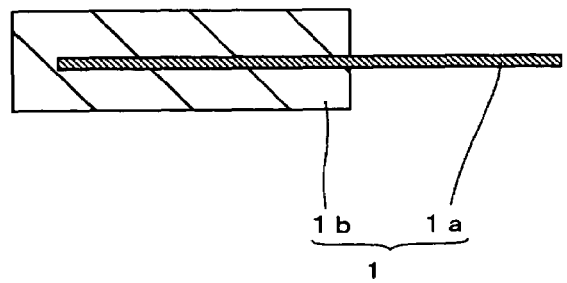
FIG. 8 is a cross-sectional view for explaining a first process of formation processes of the solid electrolytic capacitor according to Example 1 of the present invention.

First, as shown in FIG. 8, the anode 1 provided with the anode lead 1a and a cuboid base substance 1b, is formed. The cuboid base substance 1b is made of a porous sintered body of niobium particles having an average particle diameter of about 1 μm. The cuboid base substance 1b is of about 3.3 mm×about 2.7 mm×about 1.7 mm. The base substance 1b is formed by thermal treatment of a compact in a vacuum. In the compact, another end portion of the anode lead 1a is buried, and the compact is made of niobium particles.

(Formation of a Dielectric Layer)

Figure 9:
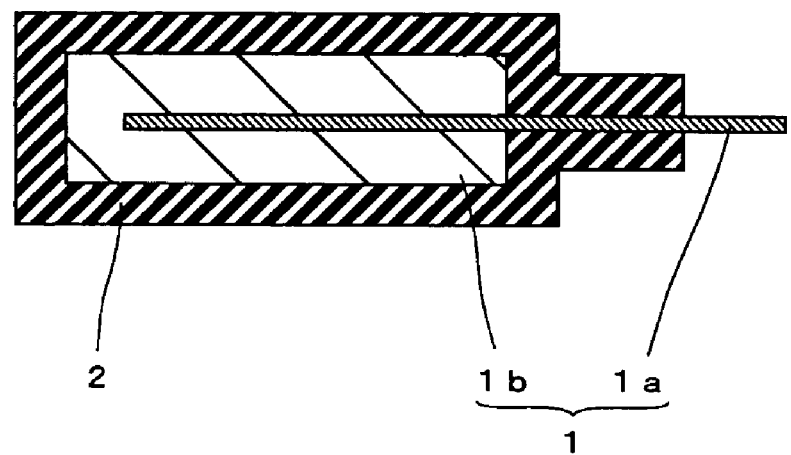
FIG. 9 is a cross-sectional view for explaining a second process of the formation processes of the solid electrolytic capacitor according to Example 1 of the present invention.

Next, by performing anodic oxidation on the anode 1 for about 10 hours at a constant voltage of about 20 V in a solution of phosphoric acid of about 0.1 wt %. The solution of phosphoric acid is maintained at about 60° C. The first oxide layer 2 including $Nb_2O_5$ is formed, as shown in FIG. 9, so as to cover the base substance 1b.

(Formation of an Electrolyte Layer)

Figure 10:
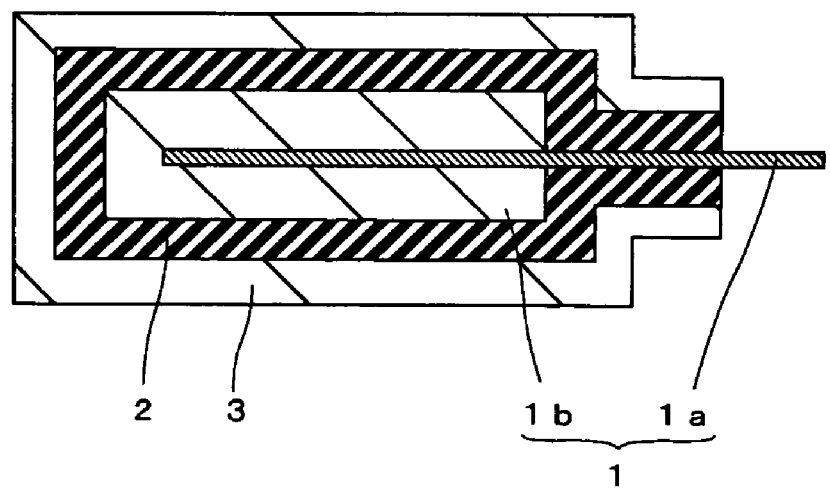
FIG. 10 is a cross-sectional view for explaining a third process of the formation processes of the solid electrolytic capacitor according to Example 1 of the present invention.

Subsequently, as shown in FIG. 10, the anode 1 on which the first oxide layer 2 is formed, is thermally treated for about 30 minutes at about 200° C. under a reduced pressure of about $1\times10^{-3}$ Pa and $Nb_2O_5$ in a region at a depth of about 25 nm is deoxidized. Thereby, the second oxide layer 3 including $NbO_{1.5}$ is formed on the first oxide layer 2. Here, the first oxide layer 2 functions as an electrolyte layer. In addition, a film thickness of the second oxide layer 3 as well as a composition ratio x of niobium oxide $NbO_x$ can be checked by analyzing cross-sections of the anode 1, first oxide layer 2 and second oxide layer 3 by use of electron energy loss spectroscopy (EELS). Note that a temperature of this thermal treatment is measured by a thermoelectric sensor placed in the vicinity of a heated specimen.

(Formation of a Cathode)

Figure 11:
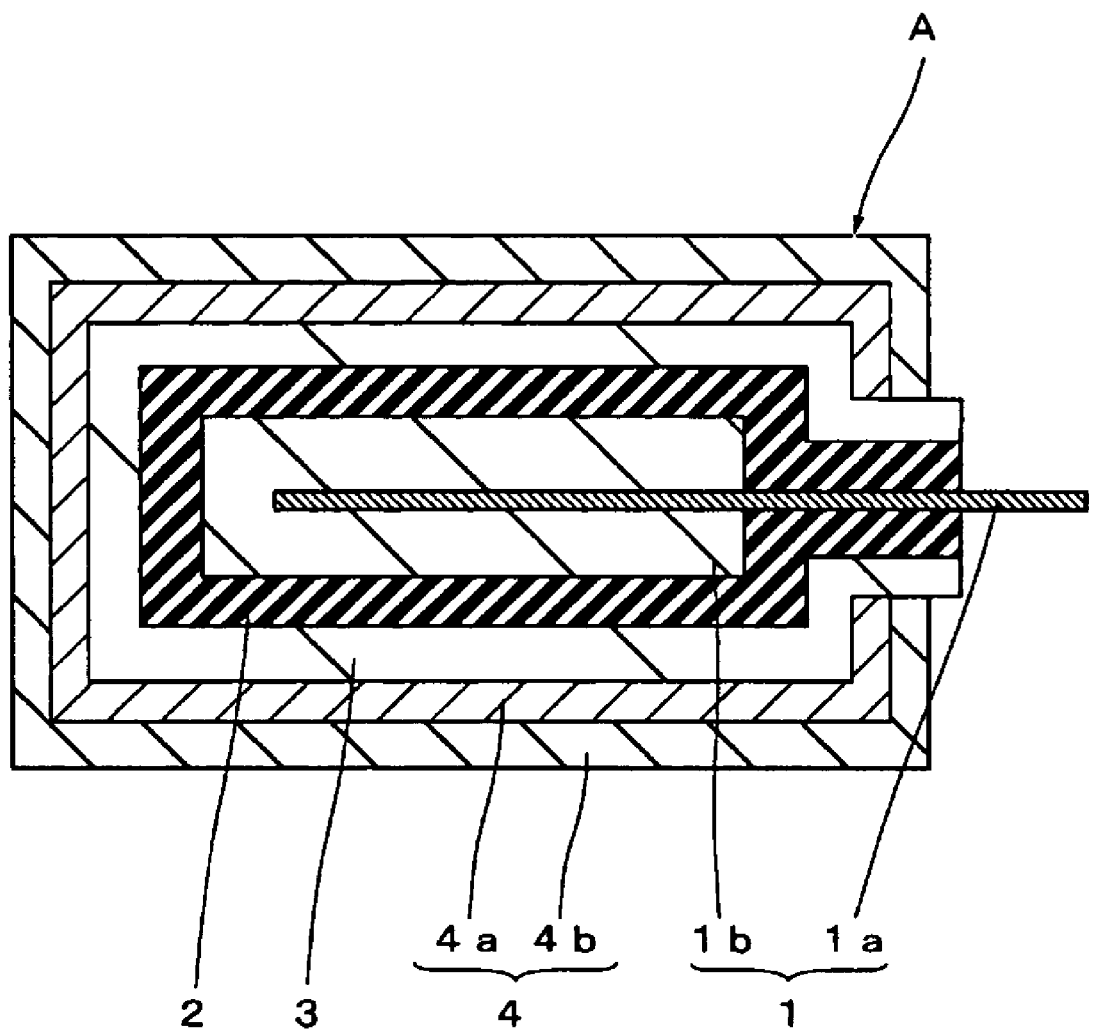
FIG. 11 is a cross-sectional view for explaining a fourth process of the formation processes of the solid electrolytic capacitor according to Example 1 of the present invention.

Next, as shown in FIG. 11, the first conductive layer 4a including carbon particles is formed by applying carbon paste on the second oxide layer 3 so as to cover the second oxide layer 3, and by drying the carbon paste for about 30 minutes at about 80° C. Thereafter, the second conductive layer 4b including silver particles is formed by applying silver paste on the first conductive layer 4a so as to cover the first conductive layer 4a, and by drying the silver paste for about 30 minutes at about 170° C. Thereby, the solid electrolytic capacitor element A is formed. In the solid electrolytic capacitor element A, the first oxide layer 2, the second oxide layer 3 and the cathode 4 are sequentially laminated on the anode 1.

(Connection of an Electrode Terminal)

Figure 12:
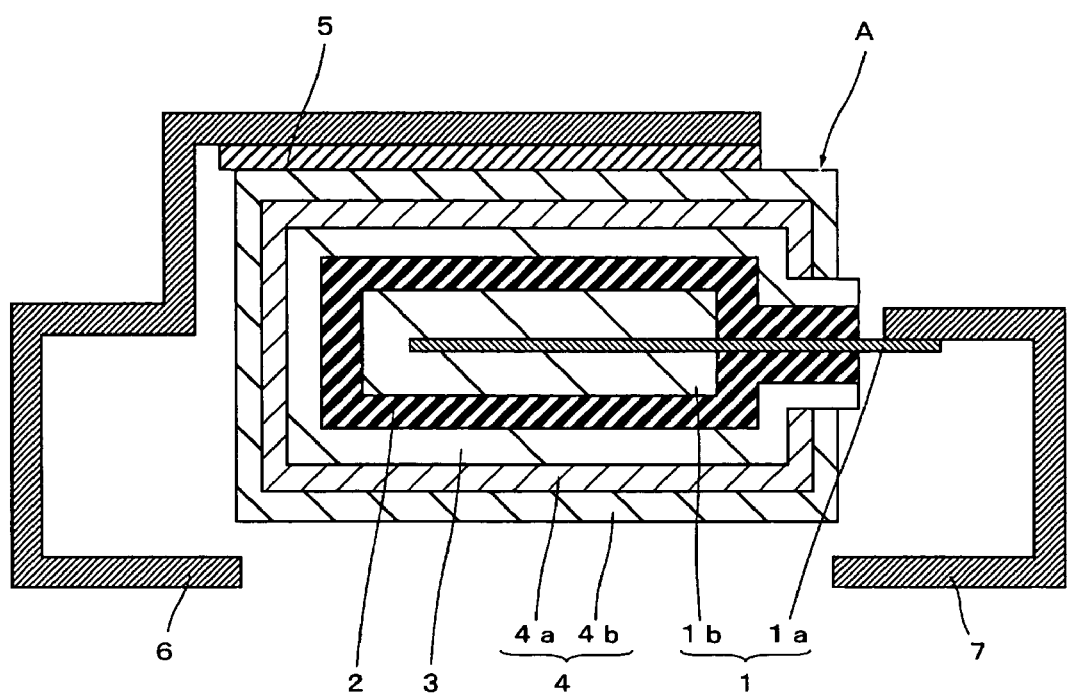
FIG. 12 is a cross-sectional view for explaining a fifth process of the formation processes of the solid electrolytic capacitor according to Example 1 of the present invention.

After that, as shown in FIG. 12, about 2 mg of a conductive adhesive is applied on the cathode terminal 6 made of iron foil having a thickness of about 0.1 mm. The surfaces of the iron foil are nickel-plated. Thereafter, the cathode terminal 6 is adhered to an upper surface of the the cathode 4 with this conductive adhesive. Furthermore, the conductive adhesive layer 5 is formed by drying the conductive adhesive for about 30 minutes at about 60° C.

Additionally, the anode terminal 7 made of iron foil having a thickness of about 0.1 mm is welded onto the cathode lead 1a exposed through the base substance 1b, the first oxide layer 2 and the second oxide layer 3. The surfaces of iron foil are nickel-plated.

(A Molding Process)

Finally, as shown in FIG. 7, the mold external packaging resin 8 is formed in the solid electrolytic capacitor element A, the cathode terminal 6 and the anode terminal 7. The cathode terminal 6 and the anode terminal 7 are pulled out to the outside. Thus, the solid electrolytic capacitor according to Example 1 is constructed.

Example 2

In Example 2, a solid electrolytic capacitor similar to Example 1 is prepared except that a porous sintered body of niobium alloy particles including aluminum at about 1 wt % is used in Example 2, in place of the base substance 1b formed of the porous sintered body of niobium particles in Example 1.

Comparative Example 1

In Comparative Example 1, a solid electrolytic capacitor similar to Example 1 is prepared except that a conductive polymer layer formed of polypyrrole is used in Comparative Example 1, in place of the second oxide layer 3 including $NbO_{1.5}$ in Example 1. Note that formation of the conductive polymer layer is performed on the first oxide layer by electrolytic polymerization of pyrrole.

Comparative Example 2

In Comparative Example 2, a solid electrolytic capacitor similar to Example 1 is prepared except that a manganese dioxide layer is used in Comparative Example 2, in place of the second oxide layer 3 including $NbO_{1.5}$ in Example 1. Note that in formation of the manganese dioxide layer, the following process is repeated for five times. Specifically, the process is performed by thermal treatment of the anode 1 at about 400° C., after soaking the anode 1 where the first oxide layer 2 is formed, in a solution of manganese nitrate of about 30 wt % for about 30 seconds.

(Assessment 1)

Figure 13:
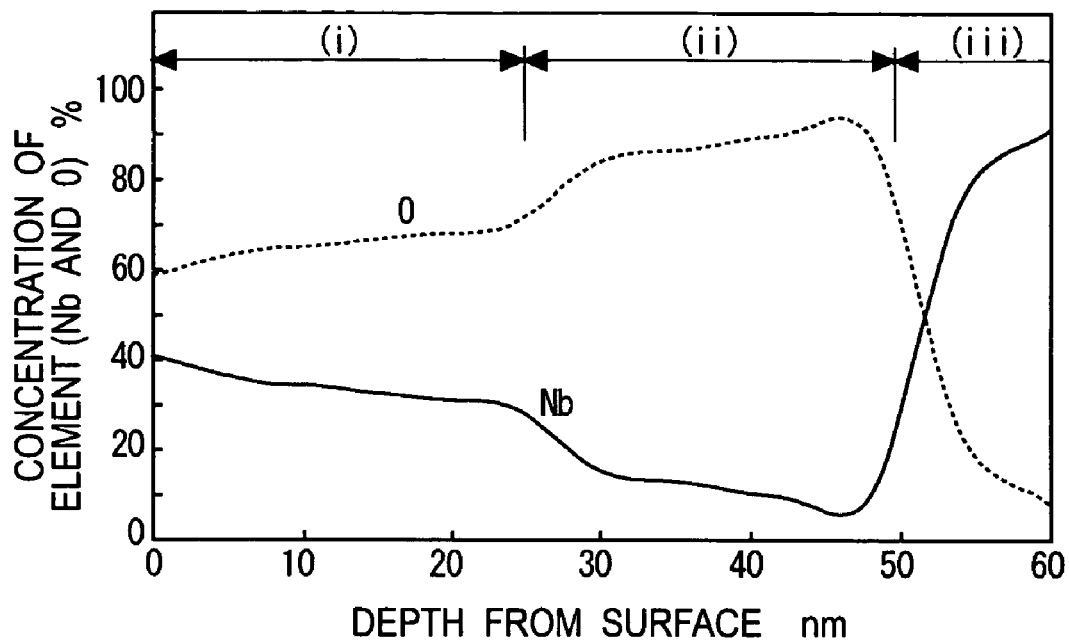
FIG. 13 is a graph showing results of measurement by use of EELS for a first oxide layer and a second oxide layer of a solid electrolytic capacitor element A prepared for Example 1.

First, with respect to the first oxide layer 2 and the second oxide layer 3 of the solid electrolytic capacitor A prepared in Example 1, composition analysis in thickness directions thereof is performed. FIG. 13 is a graph showing results of measurement by EELS for the first oxide layer 2 and the second oxide layer 3 of the solid electrolytic capacitor element A prepared in Example 1. Note that the measurement is performed before the formation of the cathode 4. In FIG. 13, the vertical axis indicates concentration of each element, and horizontal axis indicates a depth from a surface of the second oxide layer 3.

It is apparent from FIG. 13 that a concentration of oxide is relatively low, and a composition ratio x of $NbO_x$ is relatively small (about 1.5 to about 2.0) in a region (i) at a depth of about 25 nm from the surface as compared to a region (ii) at depths between about 25 nm and about 50 nm. Consequently, the region (i) is considered to correspond to the second oxide layer 3 rich in $NbO_{1.5}$.

Moreover, referring to FIG. 13, a concentration of oxide is relatively high, and a composition ratio x of $NbO_x$ is relatively large in the region (ii) as compared to the region (i). Thus, the region (ii) is considered to correspond to the first oxide layer 2 including $Nb_2O_5$. Incidentally, an oxygen concentration in a region (iii) at depths equal to or more than about 50 nm from the surface is low, and is considered to correspond to the anode 1.

Subsequently, with respect to the solid electrolytic capacitors prepared respectively in Examples 1 and 2, and Comparative Examples 1 and 2, ESRs at a frequency of about 100 kHz are measured. The ESRs are measured by applying a voltage between the cathode terminal 6 and the anode terminal 7 with an LCR meter. The results thereof are shown in Table 1.

TABLE 1

|  | ESR (mΩ) |
|---|---|
| Example 1 | 12 |
| Example 2 | 12 |
| Comparative Example 1 | 18 |
| Comparative Example 2 | 200 |

As shown in Table 1, it is clear that the ESRs are reduced in both of the solid electrolytic capacitors of Examples 1 and 2 as compared to those in the Comparative Examples 1 and 2.

Example 3

Next, consideration is given to influence of a temperature for thermal treatment of the first oxide layer 2 in a formation process of the solid electrolytic capacitor of Example 1 of the present invention.

Specifically, in Example 3, solid electrolytic capacitors are prepared in the similar process as that of Example 1 except that thermal treatments at about 140° C., about 150° C., about 175° C., about 225° C., about 245° C. and about 250° C. are given to the respective solid electrolytic capacitors instead of applying the thermal treatment at about 200° C. in Example 1.

(Assessment 2)

Subsequently, with respect to each of the solid electrolytic capacitors thus prepared as described above, an ESR at a frequency of about 100 kHz is measured. The ESR is measured by applying a voltage between the cathode terminal 6 and the anode terminal 7 with the LCR meter. The results are shown in Table 2 along with the results obtained with respect to the solid electrolytic capacitors prepared in Example 1

Figure 14:
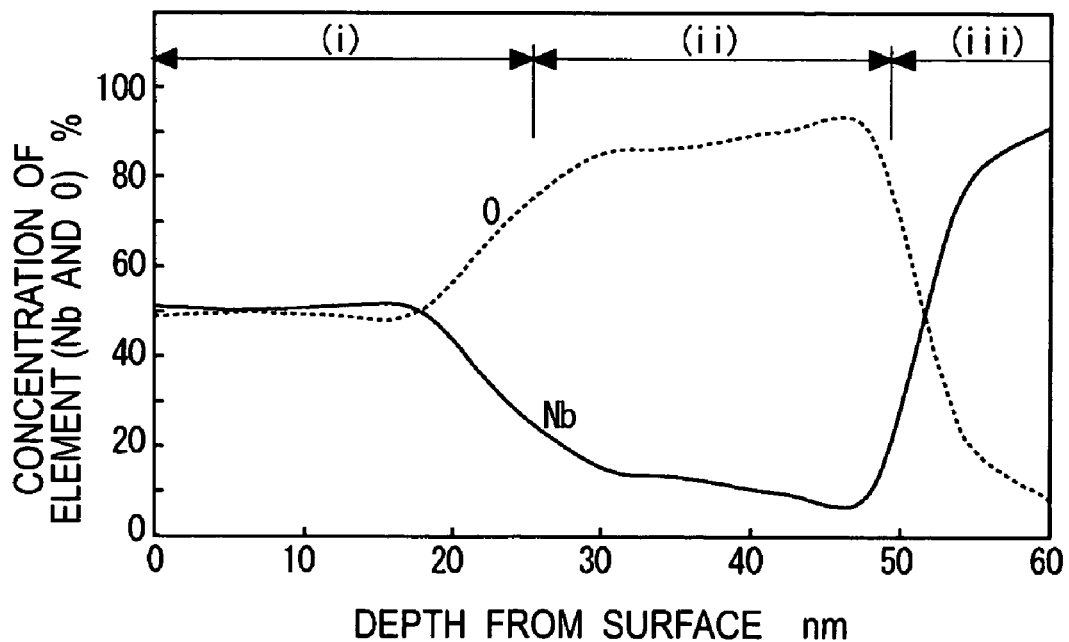
FIG. 14 is a graph showing results of measurement by EELS for a first oxide layer and a second oxide layer of a solid electrolytic capacitor element A prepared by thermal treatment of a first oxide layer 2 at around 245° C. in Example 3.

In addition, with respect to each of the solid electrolytic capacitor elements A prepared in Example 3, cross-sections of the anode 1, the first oxide layer 2 and the second oxide layer 3 are analyzed in a similar manner to Example 1. FIG. 14 is a graph showing results of measurement by EELS for the first oxide layer 2 and the second oxide layer 3 of the solid electrolytic capacitor element A prepared by thermal treatment of the first oxide layer 2 at about 245° C. in Example 3. Note that the measurement is performed before the formation of the cathode 4. In FIG. 14, the vertical axis indicates concentration of each element and horizontal axis indicates a depth from a surface of the second oxide layer 3.

It is apparent from FIG. 14 that a concentration of oxide is relatively low, and a composition ratio x of $NbO_x$ is relatively small (about 1.0) in a region (i) at a depth of about 25 nm from the surface as compared to a region (ii) at depths between about 25 nm and about 50 nm. Consequently, the region (i) is considered to correspond to the second oxide layer 3 rich in NbO.

Moreover, referring to FIG. 14, a concentration of oxide is relatively high, and a composition ratio x of $NbO_x$ is relatively large in the region (ii) as compared to the region (i). Thus, the region (ii) is considered to correspond to the first oxide layer 2 including $Nb_2O_5$. Incidentally, an oxygen concentration in a region (iii) at depths equal to or more than about 50 nm from the surface is low, and is considered to correspond to the anode 1.

Similarly, a composition ratio x of niobium oxide $NbO_x$ of the second oxide layer 3 is assessed, with respect to each of the solid electrolytic capacitor elements A prepared by giving thermal treatments at the other temperatures. Results are shown in Table 2. Incidentally, in the case where thermal treatment is given at about 250° C., $Nb_2O_5$ is entirely deoxidized to NbO. Specifically, in this case, the first oxide layer 2 did not exist between the anode 1 and the cathode 4, and only the second oxide layer 3 exists therebetween. The second oxide layer 3 of NbO alone cannot function as a dielectric layer, the second oxide layer 3 of NbO having a large conductivity. For this reason, the ESR is not assessed.

TABLE 2

| Thermal Treatment Temperature | Second Oxide Layer | ESR (mΩ) |
|---|---|---|
| 140° C. | $NbO_2$ | 17 |
| 150° C. | $NbO_{1.9}$ | 13 |
| 175° C. | $NbO_{1.75}$ | 11 |
| 200° C. | $NbO_{1.5}$ | 12 |
| 225° C. | $NbO_{1.25}$ | 10 |
| 245° C. | NbO | 9 |
| 250° C. | (NbO) | — |

As shown in Table 2, in a range of about 140° C. and 245° C., the ESRs are smaller than those of Comparative Examples 1 and 2, and a composition ratio x of niobium oxide $NbO_x$ of the second oxide layer 3 is smaller as the thermal treatment temperature rises higher. Furthermore, the ESR is typically reduced as the composition ratio x of niobium oxide $NbO_x$ of the second oxide layer 3 is smaller.

On the bases of these results, it is clear that the composition ratio x of niobium oxide $NbO_x$ of the second oxide layer 3 in a range of $1 \leq x \leq 2$ is preferable, and that the thermal treatment temperatures in forming the second oxide layer 3 equal to or more than 140° C. and less than 250° C. are preferable. Additionally, it is apparent that the composition ratio x of niobium oxide $NbO_x$ of the second oxide layer 3 in a range of $1 \leq x \leq 1.25$ is more preferable, and that the thermal treatment temperatures in forming the second oxide layer 3 equal to or more than 225° C. and less than 250° C. are more preferable.

Example 4

Next, consideration is given to influence of a structure of the cathode 4 in the solid electrolytic capacitor of Example 1 of the present invention.

Specifically, a solid electrolytic capacitor similar to that of Example 1 is prepared except that only the second conductive layer 4b including silver particles is used in Example 4, in place of the cathode 4 of Example 1 having a laminated structure where the first conductive layer 4a including carbon particles, and the second conductive layer 4b including silver particles formed so as to cover the the first conductive layer 4a.

(Assessment 3)

Next, an ESR is measured at a frequency of about 100 kHz with respect to the prepared solid electrolytic capacitor. The ESR is measured by applying a voltage between the cathode terminal 6 and the anode terminal 7 with the LCR meter. The results are shown in Table 3.

TABLE 3

| | Cathode | ESR (mΩ) |
|---|---|---|
| Example 1 | First conductive layer/ Second conductive layer | 12 |
| Example 4 | Second conductive layer | 14 |

As shown in Table 3, it is clear that the ESR is sufficiently small even when the cathode 4 includes only the second conductive layer 4b. Also, with respect to reduction of the ESR, the cathode 4 having a laminated structure of the first conductive layer 4a including carbon particles and the second conductive layer 4b including silver particles, is found to be more preferable.

Note that the examples disclosed herein are to be considered as exemplifications in every aspect, and not to be considered as limiting. A scope of the present invention is represented not by the descriptions of the abovementioned examples, but by the scope of claims, and further includes all of modifications within a scope and meanings equivalent to the scope of claims.

For example, the second oxide layer 3 includes $NbO_{1.5}$ in Example 1 mentioned above. Meanwhile, the present invention is not limited to this, and the second oxide layer 3 may include another niobium oxide having the composition ratio x in a range of $1 \leq x \leq 2$, or may include another element.

Moreover, the niobium alloy including aluminum at about 1 wt % is used as material for the anode 1 in Example 2 mentioned above. Meanwhile, the present invention is not limited to this, and another niobium alloy including another element, for example, another metal such as tantalum or titanium, or nitrogen, in addition to niobium.

Furthermore, the oxide layer 2 is formed by anodizing the anode 1 in an electrolytic solution. Meanwhile, the present invention is not limited to this, and the oxide layer 2 may be formed with another method.

What is claimed:

1. A solid electrolytic capacitor element comprising:
   a first oxide layer including $Nb_2O_5$ and formed on an anode;
   a second oxide layer including $NbO_x$ ($1 < x < 2$) and formed on the first oxide layer; and
   a cathode formed on the second oxide layer.

2. The solid electrolytic capacitor element according to claim 1, wherein,
   the cathode has a laminated structure of a first conductive layer including carbon particles formed on the second oxide layer and a second conductive layer including silver particles formed on the first conductive layer.

3. A solid electrolytic capacitor comprising:
   a first oxide layer including $Nb_2O_5$ and formed on an anode;
   a second oxide layer including $NbO_x$ ($1 < x < 2$) and formed on the first oxide layer;
   a cathode formed on the second oxide layer; and
   an external packaging body formed on the cathode.

* * * * *